(12) United States Patent
Klück et al.

(10) Patent No.: US 6,580,695 B2
(45) Date of Patent: Jun. 17, 2003

(54) ELECTRONIC CONFERENCING SYSTEM CAPABLE OF COMMUNICATING DATA THROUGH A LOCAL AREA NETWORK

(75) Inventors: Joseph R. Klück, Portland, OR (US); David W. Gaddis, Beaverton, OR (US); Gene I. Su, San Jose, CA (US); Vilma L. Uriarte, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/120,977

(22) Filed: Apr. 11, 2002

(65) Prior Publication Data

US 2002/0110092 A1 Aug. 15, 2002

Related U.S. Application Data

(63) Continuation of application No. 09/221,234, filed on Dec. 23, 1998, now abandoned, which is a continuation of application No. 08/739,482, filed on Oct. 28, 1996, now Pat. No. 5,818,871.

(51) Int. Cl.[7] ............................................. H04L 12/16
(52) U.S. Cl. ....................................... 370/261; 370/466
(58) Field of Search ................................ 370/260–265, 370/230–235, 352, 468, 389, 401, 395; 709/204, 225–230, 219

(56) References Cited

U.S. PATENT DOCUMENTS

| | | | |
|---|---|---|---|
| 5,446,736 A | | 8/1995 | Gleason et al. |
| 5,493,568 A | * | 2/1996 | Sampat et al. ............... 370/261 |
| 5,627,829 A | | 5/1997 | Gleason et al. |
| 5,630,061 A | * | 5/1997 | Richter et al. ............... 709/227 |
| 5,799,151 A | * | 8/1998 | Hoffer ......................... 709/204 |
| 5,841,976 A | * | 11/1998 | Tai et al. ..................... 370/260 |
| 5,859,979 A | | 1/1999 | Tung et al. |
| 5,862,388 A | | 1/1999 | Danneels et al. |
| 5,913,062 A | | 6/1999 | Vrvilo et al. |
| 5,999,609 A | | 12/1999 | Nishimura |
| 6,044,081 A | | 3/2000 | Bell et al. |
| 6,130,880 A | * | 10/2000 | Naudus et al. .............. 370/235 |
| 6,304,576 B1 | | 10/2001 | Corley et al. |
| 6,327,621 B1 | | 12/2001 | Lee et al. |

OTHER PUBLICATIONS

Narrow–Based Visual Telephone Systems and Terminal Equipment; International Telecommunication Union; Telecommunication Standardization Sector of ITU; ITU–T Recommendation H.320; Mar., 1993; 2 Pages.

Line Transmission of Non–Telephone Signals; International Telecommunication Union; Telecommunication Standardization Sector of ITU; Draft ITU–T Recommendation H.323; May 28, 1996; pp. 1, 11, 21, and 22.

* cited by examiner

Primary Examiner—Kwang Bin Yao
Assistant Examiner—Prenell Jones
(74) Attorney, Agent, or Firm—Blakely, Sokoloff, Taylor & Zafman LLP

(57) ABSTRACT

A method and apparatus capable of transmitting and receiving non-Local Area Network (LAN)electronic conferencing data over a LAN is disclosed. The method involves an electronic conferencing system with a communication stack conforming to a non-LAN based conferencing protocol. However, the communication stack exchanges the non-LAN data with the LAN. The communication stack may further include a transmission formatter conforming to the non-LAN based conferencing protocol and a modular interface layer, coupled to the transmission formatter. The modular interface layer exchanges the non-LAN data with the LAN.

21 Claims, 6 Drawing Sheets

ELECTRONIC CONFERENCING SYSTEM CAPABLE OF COMMUNICATING DATA THROUGH A LOCAL AREA NETWORK

This is a continuation of application Ser. No. 09/221,234, filed on Dec. 23, 1998, now abandoned, which is a continuation of Ser. No. 08/739,482 filed on Oct. 28, 1996, which is now U.S. Pat. No. 5,818,871.

FIELD OF THE INVENTION

This invention relates to telecommunication technologies generally and particularly to conferencing systems capable of communicating data through a local area network.

BACKGROUND OF THE INVENTION

As technologies continue to advance in high speed, many high-tech companies attempt to commercialize their products in a short period of time in order to remain competitive in their respective markets. However, speeding up research and development alone will not ensure a product's commercial success. The reliability of the product also plays an important role, especially in telecommunication equipment areas to which the present invention is related.

More specifically, data integrity and interoperability are two key reliability elements in a highly complex electronic conferencing system. The electronic conferencing system typically conforms to protocols defined by Telecommunication Standardization Sector of International Telecommunication Union (ITU-T). Also, the conferencing system is capable of transmitting video, audio, data collaboration and control/indication information. Achieving high data integrity and interoperability of the electronic conferencing systems often involves an iterative and thorough verification process of the system's communication stack. A communication stack represents a combination of software and hardware, which allows the system to communicate with another system, or a network or even with the system itself (well known in the art as "loopback"). The mentioned software and hardware implement thereon components such as appropriate protocols, industry specifications or standards, interfaces to other applications, network interface devices and its associated device drivers, or any other needed components to make the communication possible.

Frequently, the discussed verifications do not take place until the entire communication stack is available. Since many of the communication stack's components are often independently developed, such as a third-party-developed device driver for a network interface device, timely deliveries of all components become condition precedents for completing the verification process on time.

In addition to the possible dependency on third parties' components, the communication stack usually becomes obsolete when its originally intended uses mature. Since developers often design and implement the communication stack with only the original use in mind, much of their developed components cannot be reused in a different setting.

As an illustration, as more computers connect to networks, a different conferencing standard, ITU-T Recommendation H.323 (published in May, 1996), appears to gain wider acceptance. Although many conferencing systems employing a more matured conferencing technology for point to point connection like ITU-T Recommendation H.320 (published in March 1993), H.320 conferencing systems are still widely used today. Unfortunately, most of these H.320 conferencing systems cannot be easily modified to operate in a network environment. Additionally, in order to bridge two conferencing systems with two different conferencing protocols, a gateway performing translation from one conferencing protocol to another is needed. As has been demonstrated, moving from a point to point setting to a network environment, much of the already developed components cannot be easily reused, and new components need to be reinvented and implemented.

As has been demonstrated, an alternative method and apparatus is needed to allow a conferencing system to transmit and receive non-Local Area Network (LAN) electronic conferencing data, such as H.320 data, over a LAN.

SUMMARY OF THE INVENTION

A method and apparatus capable of transmitting and receiving non-Local Area Network (LAN) electronic conferencing data over a LAN is disclosed. The method involves a electronic conferencing system with a communication stack conforming to a non-LAN based conferencing protocol. However, the communication stack exchanges the non-LAN data with the LAN.

In one embodiment, the communication stack further includes a transmission formatter conforming to the non-LAN based conferencing protocol and a modular interface layer, coupled to the transmission formatter. The modular interface layer exchanges the non-LAN data with the LAN.

Although this embodiment of the present invention discusses a modular design scheme, it should be obvious to one ordinarily skilled in the art to employ a different method and still do not exceed the scope of the present invention.

BRIEF DESCRIPTION OF THE DRAWINGS

The present invention is illustrated by way of example and is not limited by the figures of the accompanying drawings, in which like references indicate similar elements, and in which.

DETAILED DESCRIPTION

A method and apparatus capable of transmitting and receiving non-Local Area Network (LAN) electronic conferencing data over a LAN is described. In the following description, numerous specific details are set forth such as H.320, H.323, Win32® Application Programming Interface (API) named pipes, etc. in order to provide a thorough understanding of the present invention. However, it will be apparent to one of ordinary skill in the art that the invention may be practiced without these particular details. In other instances, well-known elements and theories such as multithreading programming, Win32® API, named pipe usage, processes, Integrated Services Digital Network (ISDN), LAN, audio visual conferencing technology, ITU-T recommendations, etc. have not been discussed in special details in order to avoid unnecessarily obscuring the present invention.

Moreover, systems capable of transmitting and receiving electronic conferencing data, especially audio, video, data collaboration, or control/indication information, are referred to as electronic conferencing systems throughout the following discussions. Unless otherwise indicated, words such as electronic conferencing systems and conferencing systems are used interchangeably. Also, phrases such as "A communicating with B" or "A communicating to B" generally refer to exchanging electronic conferencing information between A and B.

Figure 1A:
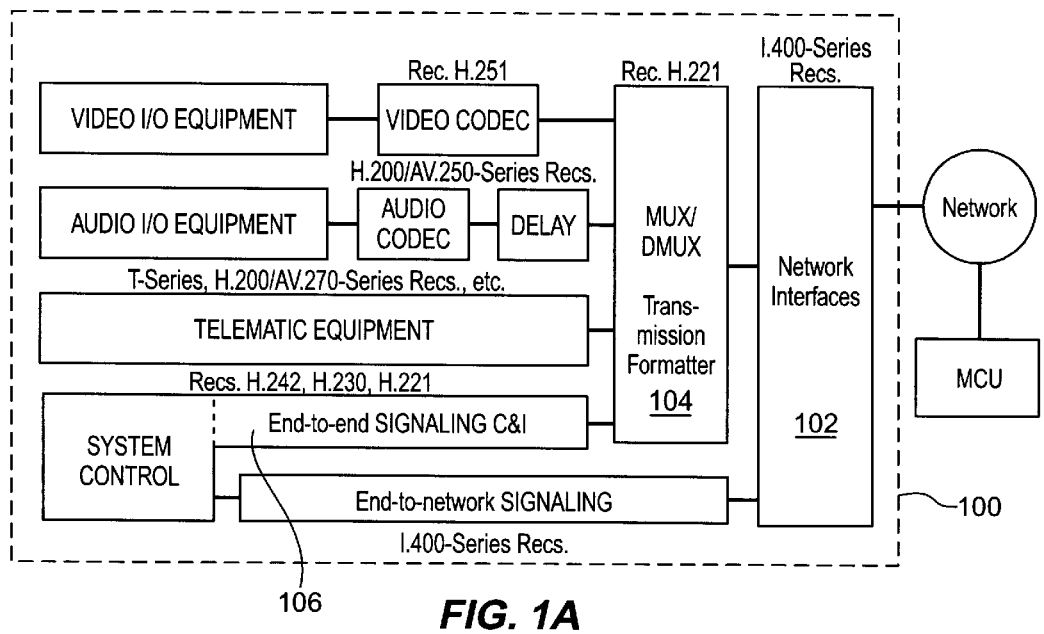
FIG. 1a illustrates a prior art H.320 conferencing system.
Figure 1B:
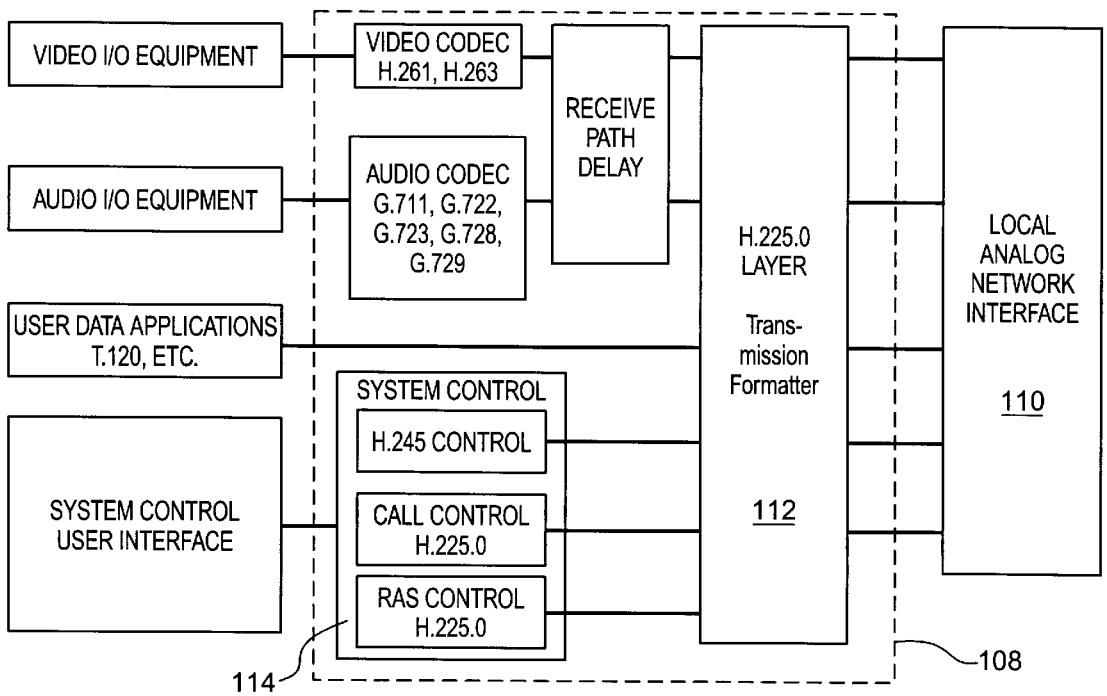
FIG. 1b illustrates a prior art H.323 conferencing system.

FIGS. 1a and 1b illustrate the block diagrams for two known electronic conferencing systems. The illustrative system in FIG. 1a conforms to ITU-T H.320 Recommendation, and the system in FIG. 1b conforms to ITU-T H.323 Recommendation. H.320 Recommendation delineates specifications for narrow-band visual telephone systems and terminal equipment, where "narrow-band" is defined as ". . . 64 kbit/s to 1920 kbit/s . . . provided as a single B/$H_0$/$H_{11}$/$H_{12}$-channel or multiple B/$H_0$-channels in ISDN." (ITU-T H.320 Recommendation, "Definitions" section) In other words, H.320 Recommendation is an example of a non-LAN based conferencing protocol. The data conform to the formats specified by H.320 Recommendation are examples of non-LAN based electronic conferencing data.

On the other hand, H.323 Recommendation specifies one LAN based conferencing protocol. The recommendation details "the technical requirements for narrow-band visual telephone services . . . where the transmission path includes one or more Local Area Network (LAN) . . . Examples of this type of LAN are: Ethernet (IEEE 802.3), Fast Ethernet (IEEE 802.10), FDDI (non-guaranteed quality of service mode) and Token Ring (IEEE 802.5)." (ITU-T H.323 Recommendation, "Scope" section)

In short, FIG. 1a describes conferencing system 100, which communicates with ISDN through network interfacd 102. FIG. 1b illustrates conferencing system 108, which communicates with LAN through LAN interface 110. It should be noted that conferencing systems 100 and 108 have different components, such as network interfaces 102 and 110, transmission formatters 104 and 112 finally system controls 106 and 114. Thus, in order to interoperate between conferencing systems 100 and 108, one approach utilizes a configuration similar to the one show in FIG 2. Specifically, electronic system 200 is conferencing system 108, and standalone system 224 is conferencing system 100. However, gateway 222 is a H.323 gateway, which "provides [s] the appropriate translation between transmission formats (for example H.225.0 to/from H.221)and between communications procedures (for example H.245 to/from H.242)." (ITU-T H.323, "6.3 Gateway Characteristics") method involves an electronic conferencing system with a communication stack conforming to a non-LAN based conferencing protocol. However, the communication stack exchanges the non-LAN data with the LAN. The communication stack may further include a transmission formatter conforming to the non-LAN based conferencing protocol and a modular interface layer, coupled to the transmission formatter. The modular interface layer exchanges the non-LAN data with the LAN.

Figure 2:
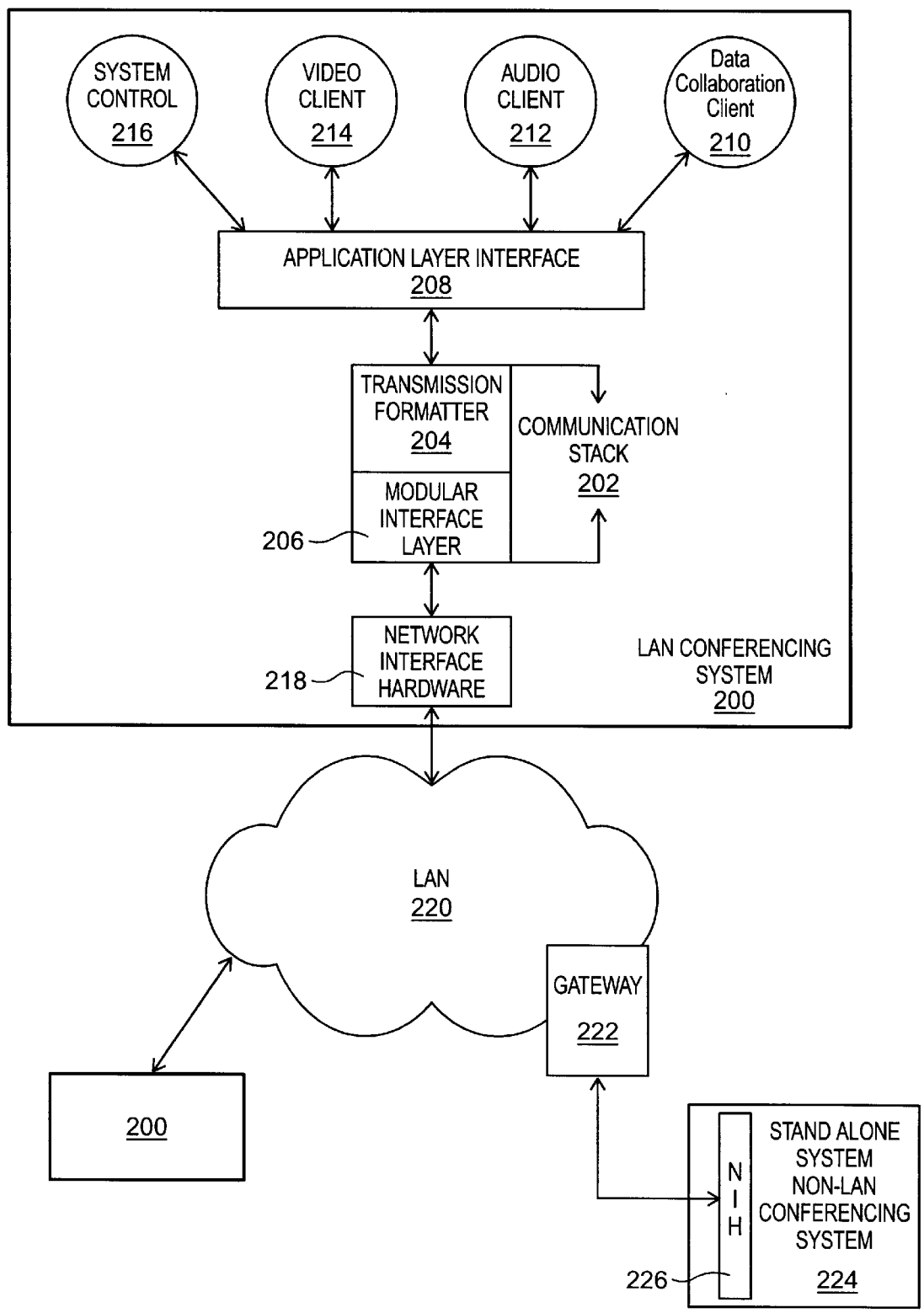
FIG. 2 illustrates the block diagram of one embodiment of the present invention.
Figure 3:
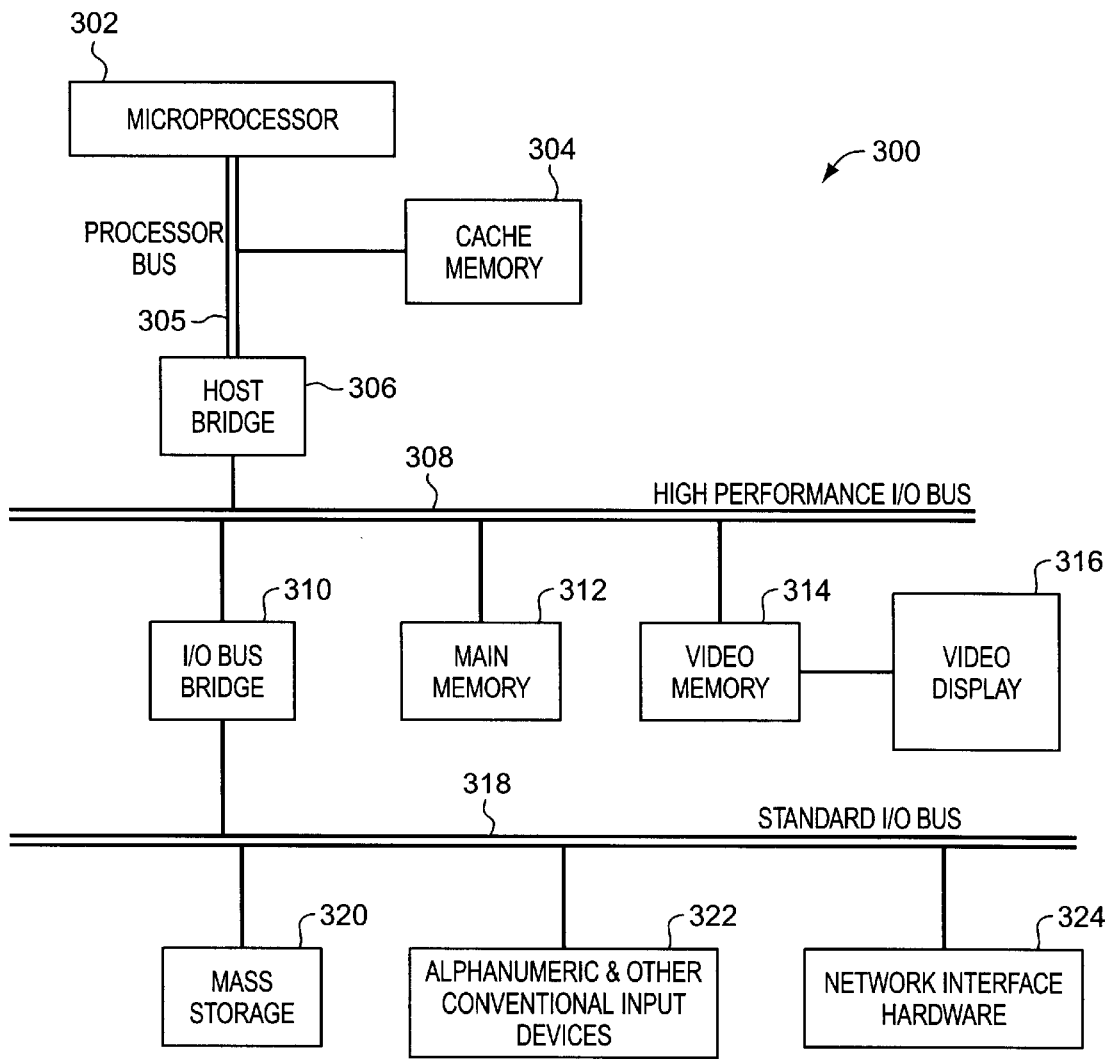
FIG. 3 illustrates a general purpose computer system architecture.

FIG. 2 demonstrates a block diagram of one embodiment of the present invention. The block diagram can be programmed or implemented in electronic system 200. Some examples of electronic system 200 are, but not limited to, add-in circuit boards, standalone electronic apparatuses and general purpose computer systems. A general purpose computer system 300 is illustrated in FIG. 3.

The general purpose computer system architecture comprises microprocessor 302 and cache memory 304 coupled to each other through processor bus 305. Sample computer system 300 also includes high performance I/O bus 308 and standard I/O bus 318. Processor bus 305 and high performance I/O bus 308 are bridged by host bridge 306, whereas high performance I/O bus 308 standard I/O bus 318 are bridged by I/O bus bridge 310. Coupled to high performance I/O bus 308 are main memory 312 and video memory 314. Coupled to video memory 314 is video display 316. Coupled to standard I/O bus 318 are mass storage 320, network interface 324, and alphanumeric input device or other conventional input device 322.

These elements perform their conventional functions well known in the art. In particular, mass storage 320 may be used to provide permanent storage for the executable instructions for an embodiment of the present invention, whereas main memory 312 may be used to temporarily store the executable instructions of an embodiment of the present invention during execution by microprocessor 302. Additionally, network interface 324 allows computer system 300 to communicatively couple to a network and exchange data with the network.

Operation of the Present Invention

The present invention is a method and apparatus capable of transmitting and receiving non-LAN electronic conferencing data over a LAN. Specifically, the present invention includes a communication stack conforming to non-LAN based conferencing protocol and exchanging data with a LAN.

FIG. 2 illustrates the block diagram of one embodiment of the present invention. The embodiment operates on electronic system 200 or in particular, general purpose computer 300. The embodiment contains communication stack 202, application layer interface 208, data collaboration client 210, audio client 212, and video client 214. Communication stack 202 further includes transmission formatter 204 and modular interface layer 206 (hereinafter referred to as MIL 206).

MIL 206 communicates with LAN 220 through network interface hardware 218 (hereinafter referred to as NIH 218). Through LAN 220, electronic system 200 can either interact with another electronic system 200 or communicate with standalone system 224 through gateway 222. Unlike the previously described H.323 gateway, gateway 222 performs minimal amount of translation between standalone system 224 and electronic system 200, because both systems conform to the same conferencing protocol. Some main differences between systems 200 and 224 are: 1) standalone system 224's lack of MIL 206 and 2) standalone system 224's interface to LAN 220 through a different Network Interface Hardware 226.

In order to further clarify the scope of the present invention, some modules illustrated in FIG. 2 warrant additional discussions. To begin with, application layer interface 208 provides applications, such as data collaboration client 210, audio client 212 video client 214 (hereinafter collectively referred to as media clients) or system control 216 access to communication stack 202. Conversely, application layer interface 208 also allows communication stack 202 to send information up to the applications. Media clients 210, 212 and 214 generate and process media information such as audio, video or data collaboration information. Although FIG. 2 presents three media clients, it should be obvious to one ordinarily skilled in the art to include any number, type or combination of media clients without exceeding the scope of the present invention.

In addition, system control 216 provides control and indication information to communication stack 202 through application layer interface 208. Some examples of control and indication information are, but not limited to: dialing information, frame alignment information, transmission error information, etc. Similar to media clients, system control 216 also follows electronic system 200's conferencing protocol.

After application layer interface 208 relays information to communication stack 202, communication stack 202 processes the information and places the processed information in a format specified by electronic system 200's conferencing protocol. In particular, transmission formatter 204 collects and packages various media information, such as audio, video or data collaboration information, and control and indication information into a predetermined data packet format. After the data packets are formulated, transmission formatter 204 transmits these data packets to MIL 206. MIL 206 then coordinates and exchanges information contained in these data packets with NIH 218.

It should be emphasized that electronic system 200 operates under a non-LAN based conferencing protocol. Particularly, electronic system 200 follows certain compression/decompression schemes, communication procedures, system control and indication information and transmission formats specified by the non-LAN based conferencing protocol. One example of a non-LAN based conferencing protocol is ITU-T H.320 Recommendation. For instance, if electronic system 200 complies with ITU-T H.320 Recommendation, its communication stack 202 then follows requirements provided by ITU-T H.221, H.242 and H.230 Recommendations, and its video client 214 conforms to ITU-T H.261.

It should be further noted that not only does the demonstrated embodiment of the present invention permit communication between a non-LAN based electronic system 200 and LAN 220, but the embodiment also features a modular design approach. In other words, each illustrated module in electronic system 200 can be developed independently. This design approach shortens product development cycle by eliminating dependencies among individual modules and by verifying module integrity early. As has been shown in FIG. 2, communication stack 202 also employs such a modular design method by splitting itself into transmission formatter 204 and MIL 206. Having MIL 206 interact with various types of NIH 218 alleviates communication stack 202's dependency on NIH 218's availability. Thus, developers can continue to design and verify transmission formatter 204 before NIH 218 even exists.

Furthermore, MIL 206 also gives communication stack 202 the flexibility to communicate with different transmission mediums without significantly altering its design or implementation. Specifically, MIL 206 provides a layer of abstraction to transmission formatter 204. In one embodiment, MIL 206 provides a set of functions for transmission formatter 204 to invoke. MIL 206 defines these functions according to the type of medium MIL 206 attempts to interoperate with. Therefore, when NIH 218 is communicatively coupled to LAN 220 as illustrated in FIG. 2, MIL 206 defines its functions to operate with a LAN-based NIH 218. On the other hand, when NIH 218 communicates with a different type of network, such as ISDN, MIL 206 then redefines the substantially same set of functions to correspond to an ISDN-based NIH 218. Since the function calls known to transmission formatter 204 remain essentially unaltered, communication stack 202 is capable of communicating with a different medium without significantly modifying itself. It should again be emphasized that although FIG. 2 shows MIL 206 communicatively coupled to NIH 218 and LAN 220, implementing MIL 206 to operate with other types of NIH 218, such as an ISDN card, a modem, etc. should be obvious to one ordinarily skilled in the art.

As an illustration of the level of abstraction MIL 206 provides, the following example describes one of many possible scenarios. Communication stack 202 attempts to open a channel for transferring data to LAN 220. In one embodiment, communication stack 202 operates in Windows NT™ and communicates with LAN 220 through Named Pipes. MIL 206 defines an opening channel function call, "OpenChannel", for communication stack 202 to invoke. Invocation of "OpenChannel" then calls the corresponding functions supported by Microsoft's Win32® API (which is supported in Microsoft's Windows operating systems) such as "CreateNamedPipe", "CreateFile" or "CallNamePipe". On the other hand, if instead communication stack 202 attempts to open channel and transfer data through ISDN line, communication stack 202 still calls "OpenChannel". Even though communication stack 202 remains unmodified in this instance, MIL 206's definition of "OpenChannel" is redefined to reflect the change in the transmission medium.

Although one embodiment of the present invention discusses a modular design scheme, it should be apparent to one ordinarily skilled in the art to design or implement the present invention with a different method and still do not exceed the scope of the present invention. Using the previously discussed "OpenChannel" example, one alternative is to have communication stack 202 directly invoke functions such as "CreateNamedPipe" without going through MIL 206. Such a method still permits a non-LAN based conferencing system to communicate with LAN 220.

After having demonstrated some advantages of one embodiment of the present invention, detailed description of the operations of the embodiment is summarized into three phases: 1) call setup phase, 2) steady state phase, 3) call termination phase.

Figure 4:
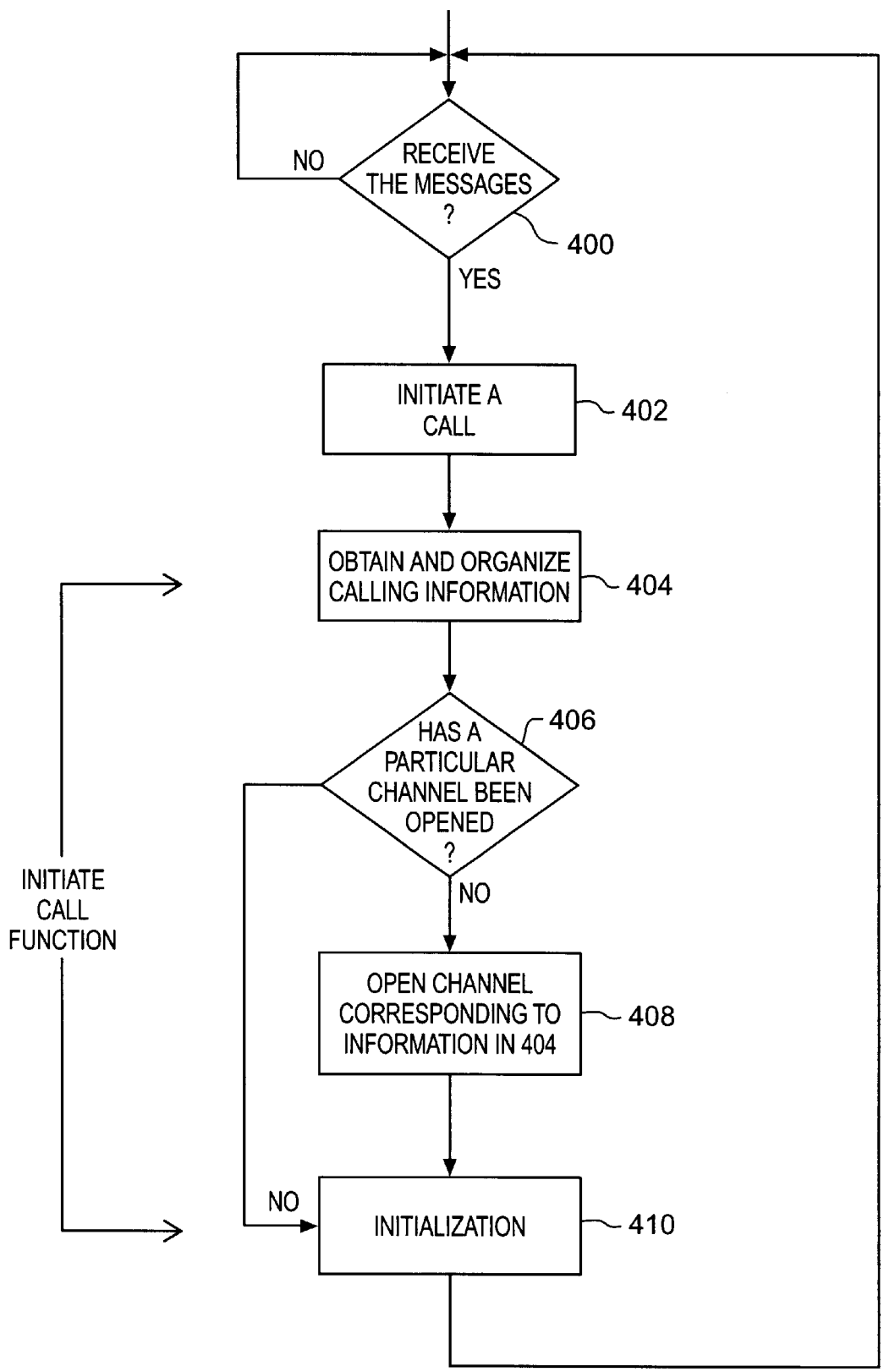
FIG. 4 illustrates a flow chart for one embodiment's call setup phase.

To begin with, FIG. 4 illustrates a flow chart of phase 1, or the call setup phase. In one embodiment, communication stack 202 operates in a process with its own thread. A process is usually defined as an instance of a running program on a general purpose computer such as 300. It occupies address space containing the program's code and data. Moreover, a process also owns a thread, which executes the code contained in the process's address space. In the present invention, the thread responsible for executing communication stack 202 waits for incoming messages before dispatching functions corresponding to such messages. In step 400, communication stack 202 waits for messages from media clients 210, 212, 214, system control 216, or from NIH 218. When the incoming message indicates to initiate a call in step 402, a corresponding initiate-call function is invoked. Specifically, some functionality of the call-initiating function is illustrated from steps 404 to 410.

In step 404, the function obtains and organizes all the calling information from application layer interface 208. Then the status of establishing a connection is verified in step 406. If the connection has been successfully established, the call-initiating function proceeds to step 410 to perform any necessary initialization. Otherwise, call-initiating function attempts to establish a connection in step 408 based on information collected in step 404. One embodiment of the present invention uses Win32® API's named pipes in communication stack 202. In particular, before a connection is established, the initiate-call function in this embodiment receives a pipe name in step 404. Based on the pipe name, a named-pipe server creates a named pipe in step 408. Once named-pipe client also successfully connects to the pipe, the server and the client can then exchange data by performing read or write operations on the pipe. Or in other words, using the configuration in FIG. 2 as an example, the pipe transfers data from one electronic system 200 to another over LAN 220.

It should be noted that a pipe is an abstraction for a section of shared memory that processes, such as communication stack 202, use for communication. Win32® API Named pipe functions embody mechanisms to communicate through LAN. As long as communication stack 202 is capable of utilizing these named pipe functions, communication stack 202 is not overly concerned with the exact underlying definitions of the functions. Also, a process that creates a pipe is a pipe server, and a process that connects to a pipe is a pipe client. Since the pipe client needs to know the pipe name in order to connect to the corresponding pipe, one approach makes the pipe name well-known to all pipe clients. In another approach, the pipe server communicates the pipe name to the pipe clients.

Although the discussed embodiment of the present invention involves the use of named pipes, communication stack 202 can instead directly communicate with LAN 220 through NIH 218. For instance, rather than invoking named pipe functions, communication stack 202 may directly call functions supported by NIH 218's device driver to communicate with LAN 220. This alternative method still yields the same outcome: a non-LAN based conferencing system communicating with LAN 220.

Figure 5:
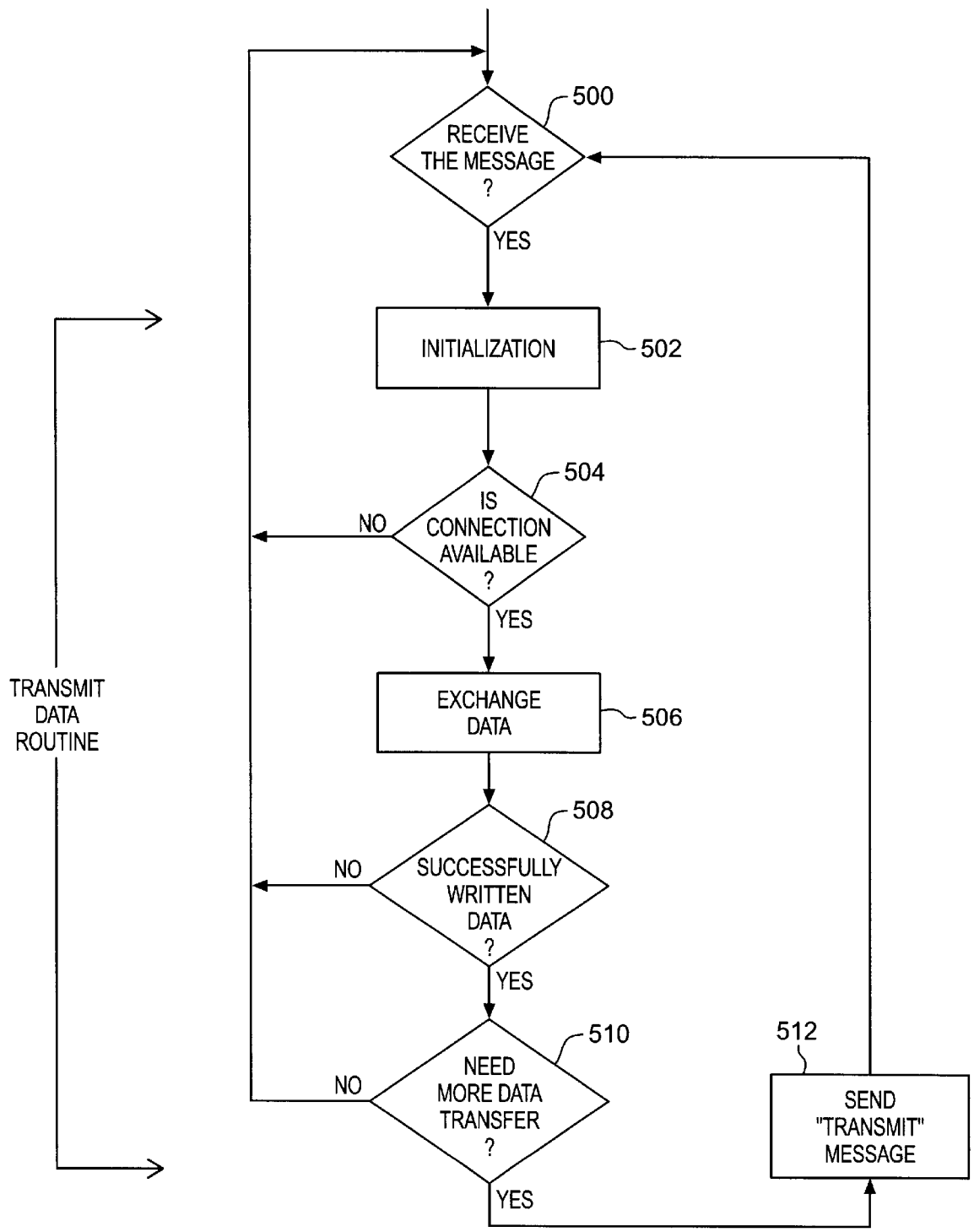
FIG. 5 illustrates a flow chart for one embodiment's steady state phase.

After the desired connection has been established, FIG. 5 illustrates one data exchange sequence between communication stack 202 and LAN 220 in phase 2, or the steady state phase. Similar to the previously discussed embodiment of the present invention, communication stack 202 operates in a process with a main execution thread, and the incoming messages to the main thread drive the thread's dispatch process. Using data transmission as an example, after the main thread receives a transmit data message in step 500, the thread dispatches a transmit data routine. One implementation of transmit data routine encompasses steps 502 to 512. The routine initializes appropriate variables in step 502 and waits for a successful establish of a connection in step 504. After a connection has been established, data exchange takes place in step 506. After data have been transmitted, the transmit data routine verifies the transmission status in step 508. If the transmission has been successful and more data are expected to be transmitted in step 510, the transmit data routine presents a transmit data message to the main execution thread in step 512. Otherwise, the main execution thread continues to wait for the next incoming message.

Using Win32® named pipe as a further illustration of one embodiment of the present invention, after a pipe server and a pipe client are connected through a pipe in step 504, the pipe server begins exchanging data over LAN 220 with the pipe client in step 506. The embodiment may utilize the abstraction MIL 206 provides to write data to the pipe, where MIL 206 defines a function invoking the named pipe "WriteFile" or "WriteFileEx" functions. Alternatively, communication stack 202 in the embodiment can directly invoke the same named pipe functions without using MIL 206. Similarly, the receive operation follows substantially the same process as the discussed write operation. Instead of "WriteFile" or "WriteFileEx", the read operation calls "ReadFile" or "ReadFileEx". Also, instead of the transmit data routine sending a transmit data message to the main execution thread in step 512, the receive data routine sends a receive data message.

Figure 6:
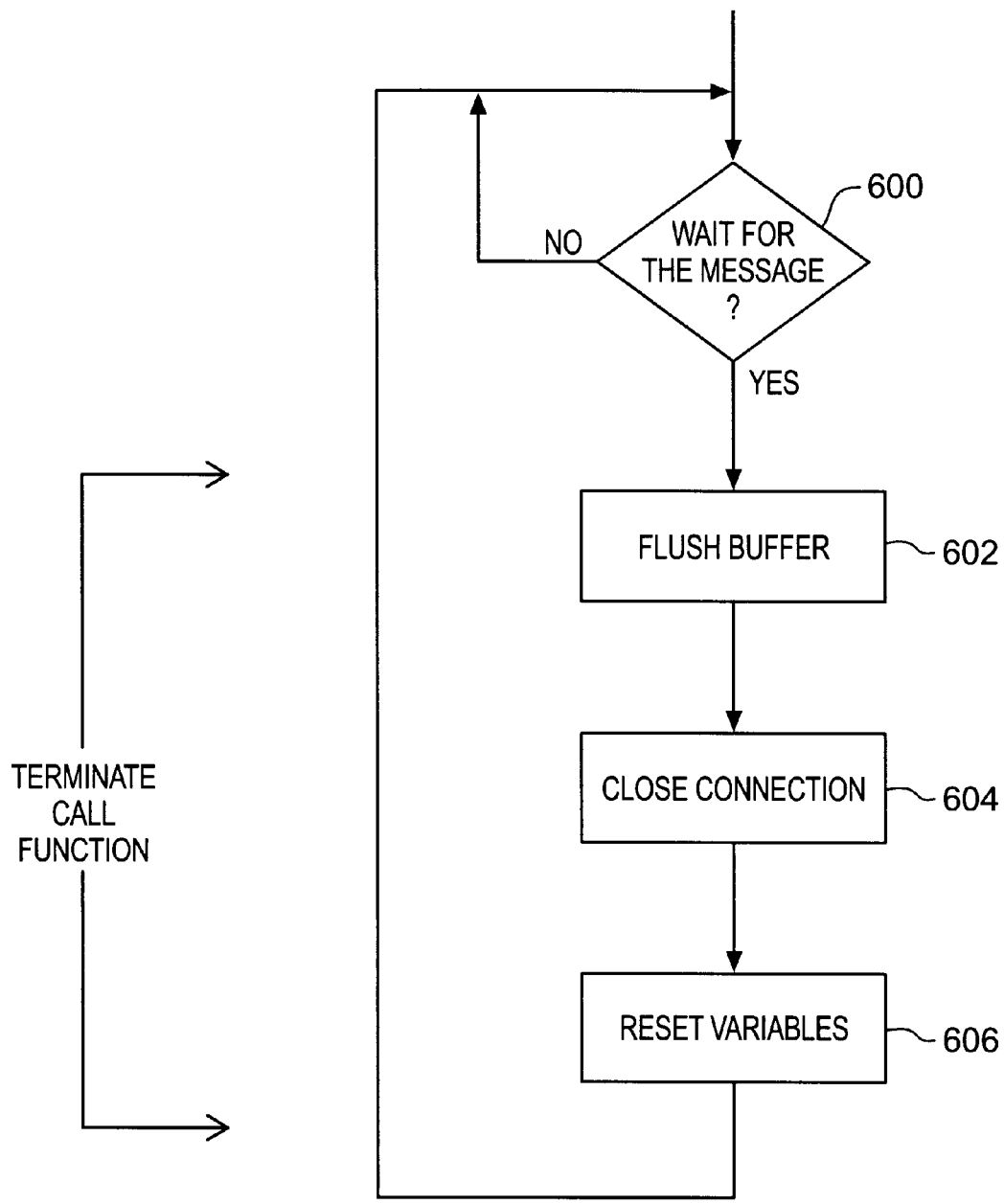
FIG. 6 illustrates a flow chart for one embodiment's call termination phase.

At the end of the steady state phase, FIG. 6 illustrates the call termination phase or phase 3. Similar to the previously discussed two phases, the main thread for communication stack 202 still waits for incoming messages in step 600. If the message indicates a call termination, the main thread dispatches a terminate call function, which consists of steps 602 to 606 in one implementation. In step 602, communication stack 202 waits for the completion and the return of all the data buffers. After all the data buffers have been processed, communication stack 202 proceeds to terminate the connection and possibly release any resources used in the connection in step 604. At last, relevant variables are reset in step 606. Some relevant Win32® API's named piped functions in this phase are: FlushFileBuffers, DisconnectNamedPipe and CloseHandle.

Although FIGS. 4, 5 and 6 contain particular steps in describing three phases of the present invention, it should be apparent to one ordinarily skilled in the art to delete, add or reorder the steps without exceeding the scope of the invention.

Thus, a method and apparatus capable of transmitting and receiving non-LAN electronic conferencing data over a LAN has been disclosed. Although the present invention has been described particularly with reference to the figures, the present invention may appear in any number of systems, which provide the capability of communicating non-LAN data over a data. It is further contemplated that many changes and modifications may be made by one of ordinary skill in the art without departing from the spirit and scope of the present invention.

What is claimed is:

1. An electronic conferencing system comprising a communications stack conforming to a non-Local Area Network (LAN) based conferencing protocol, the communication stack including a transmission formatter and being coupled to a LAN to exchange non-LAN data with the LAN, the non-LAN date conforming to formats supported by the non-LAN based conferencing protocol and the transmission formatter to operate with any combinations of non-LAN date conforming to the formats.

2. The electronic conferencing system according to claim 1, wherein said non-LAN data include at least one of audio information; video information; data collaboration information; and control and indication information.

3. The electronic conferencing system according to claim 1, wherein said non-LAN based conferencing protocol is provided by Telecommunication Standardization Sector of International Telecommunication Union (ITU-T) Recommendation H.320.

4. The electronic conferencing system according to claim 1, wherein said communication stack is capable of communicating the non-LAN data over the LAN through a gateway coupled to the LAN, to a standalone electronic conferencing system conforming to the non-LAN based conferencing protocol.

5. A method of communication non-Local Area Network (LAN) electronic conferencing data over a LAN, comprising:

conforming a conferencing system to a non-LAN based conferencing protocol, the conferencing system including a communication stack having a transmission formatter; and conforming the communication stack to the non-LAN based conferencing protocol to exchange the non-LAN electronic conferencing data with the LAN, the non-LAN electronic conferencing data conforming to formats supported by the non-LAN based conferencing protocol, and the transmission formatter to operate with any combination of the non-LAN electronic conferencing data.

6. The method according to claim 5, wherein the non-LAN electronic conferencing data include any combinations of audio information; video information; data collaboration information; and control and indication information.

7. The method according to claim 5, wherein said non-LAN based conferencing protocol is provided by Telecommunication Standardization Sector of International Telecommunication Union (ITU-T) Recommendation H.320.

8. The method according to claim 5, wherein said communication stack is capable of communicating said electronic conferencing data over said LAN through a gateway, coupled to said LAN, to a standalone electronic conferencing system conforming to said non-LAN based conferencing protocol.

9. A machine readable medium having embodied thereon instructions, which when executed by a machine, causes said machine to:

transmit and receive non-LAN electronic conferencing data over a Local Area Network (LAN), said instructions comprising a communication stack having a transmission formatter and conforming to a non-LAN based conferencing protocol to exchange the non-LAN electronic conferencing data with the LAN, the non-LAN electronic conferencing data conforming to formats supported by the non-LAN based conferencing protocol, and the transmission formatter to operate with any combination of the electronic conferencing data.

10. The machine readable medium according to claim 9, wherein said electronic conferencing data include any combinations of audio information; video information; data collaboration information; and control and indication information.

11. The machine readable medium according to claim 9, wherein said non-LAN based conferencing protocol is provided by Telecommunication Standardization Sector of International Telecommunication Union (ITU-T) Recommendation H.320.

12. The machine readable medium according to claim 9, wherein said communication stack is capable of communicating said electronic conferencing data over said LAN through a gateway, coupled to said LAN, to a standalone electronic conferencing system conforming to said non-LAN based conferencing protocol.

13. A method of communicating non-Local Area Network (LAN) electronic conferencing data over a LAN, comprising:

receiving non-LAN data; and conforming the received non-LAN data to a non-LAN based conferencing protocol;

using a module interface layer to define at least one function to operate with a non-LAN based conferencing system; and using a transmission formatter to invoke the at least one function to transfer the non-LAN data to the LAN.

14. The method of claim 13, wherein said invoking at least one function comprises invoking functions supported by Win32® Application Programming Interface (API).

15. The method according to claim 13, wherein said non-LAN data include any combinations of audio information; video information; data collaboration information; and control and indication information.

16. The method according to claim 13, wherein said non-LAN based protocol is provided by Telecommunication Standardization Sector of International Telecommunication Union (ITU-T) Recommendation H.320.

17. The method according to claim 13, wherein said communication stack is capable of communicating said electronic conferencing data over said LAN through a gateway, coupled to said LAN, to a standalone electronic conferencing system conforming to said non-LAN based conferencing protocol.

18. A system for transmitting and receiving non-LAN (Local Area Network) data over a LAN network comprising:

an application layer interface to receive non-LAN data;

a system control communicatively coupled to the application layer interface to provide control and indication information to a communication stack through the application layer interface;

the communication stack communicatively coupled to the application layer interface to format data for transmitting via a LAN by conforming itself to a non-LAN based protocol using:

a transmission formatter to collect and package the non-LAN data and control and indication information into a predetermined data packet format; and a modular interface to coordinate and exchange data packet information with network interface hardware; and the network interface hardware communicatively coupled to the communication stack to transmit the formatted data to a LAN.

19. The system of claim 18, wherein control and indication information comprise at least one of:

dialing information;

frame alignment information; and transmission error information.

20. The system of claim 18, wherein the modular interface layer coordinates and exchanges data packet information with the network interface hardware by providing at least one non-LAN based function for the transmission formatter to invoke.

21. The method of claim 20, wherein the at least one non-LAN based function comprises functions supported by Win32® Application Programming Interface (API).

* * * * *

UNITED STATES PATENT AND TRADEMARK OFFICE
CERTIFICATE OF CORRECTION

PATENT NO.     : 6,580,695 B2
DATED          : June 17, 2003
INVENTOR(S)    : Kluck et al.

It is certified that error appears in the above-identified patent and that said Letters Patent is hereby corrected as shown below:

Column 3,
Line 41, before "finally", insert -- and --.
Line 51, after "Characteristics")", delete "method involves an electronic conferencing system with a communication stack conforming to a non-LAN based conferencing protocol. However, the communication stack exchanges the non-LAN data with the LAN. The communication stack may further include a transmission formatter conforming to the non-LAN based conferencing protocol and a modular interface layer, coupled to the transmission formatter. The modular interface layer exchanges the non-LAN data with the LAN.".

Signed and Sealed this

Second Day of December, 2003

JAMES E. ROGAN
*Director of the United States Patent and Trademark Office*